L. B. HORR.
GEAR SHIFTING MECHANISM.
APPLICATION FILED FEB. 7, 1920.
1,389,195.
Patented Aug. 30, 1921.
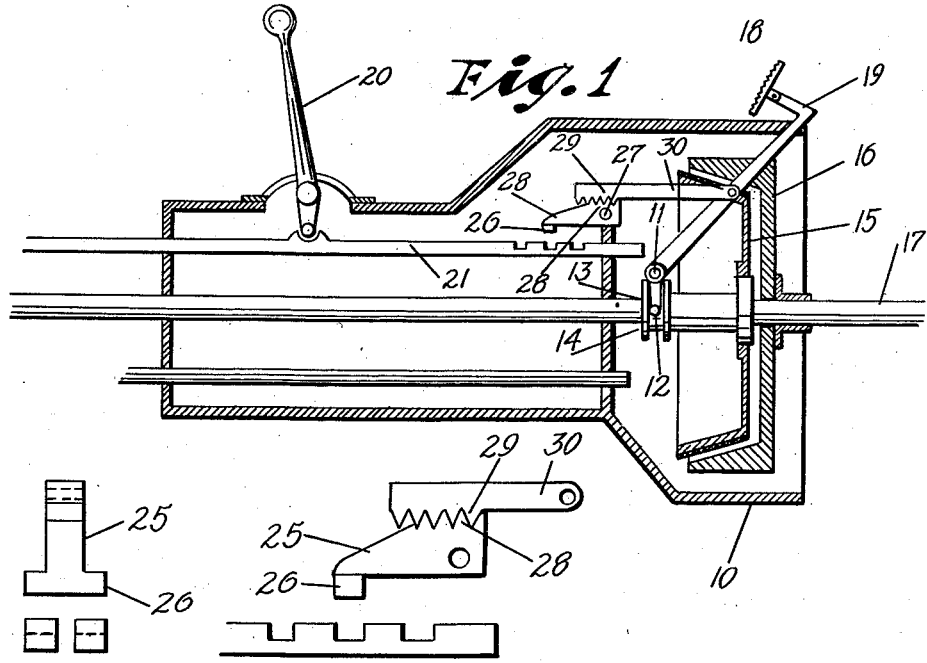
Fig. 1
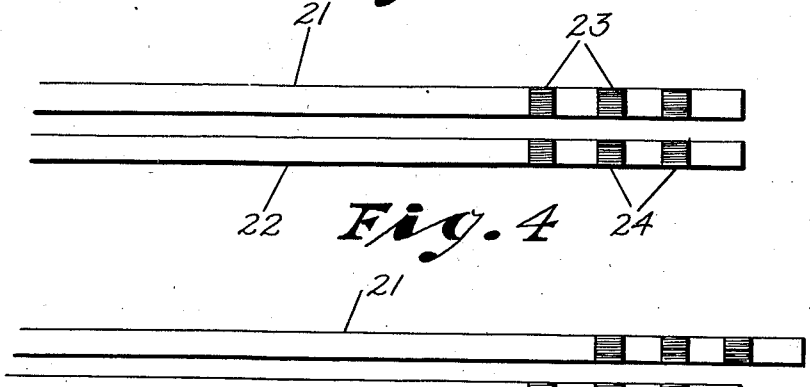
Fig. 3   Fig. 2
Fig. 4
Fig. 5
Inventor
Loren B. Horr
By Frank S. Ackerman,
Attorney.

UNITED STATES PATENT OFFICE.

LOREN B. HORR, OF STATE COLLEGE, NEW MEXICO.

GEAR-SHIFTING MECHANISM.

1,389,195.   Specification of Letters Patent.   Patented Aug. 30, 1921.

Application filed February 7, 1920. Serial No. 356,970.

*To all whom it may concern:*

Be it known that I, LOREN B. HORR, a citizen of the United States of America, residing at State College, in the county of Dona Ana and State of New Mexico, have invented certain new and useful Improvements in Gear-Shifting Mechanism, of which the following is a specification.

This invention relates to shifting mechanism for clutches of automobiles and the like and it has for its object the provision of novel means whereby shifting levers for controlling transmissions are locked against movement while a clutch of the driven shaft is operating to transmit power from the motor for operating the automobile.

A further object of this invention is to provide novel means whereby the said shifting lever is latched in different positions of adjustment, means being provided whereby the said lever is released upon operating the clutch to disengage or release the said clutch, thereby rendering it possible to operate the shifting lever only when power of the driven shaft is relieved by the disengagement of the clutch members, the invention furthermore including novel means for operating the clutch members and the latch simultaneously.

A still further object of this invention is to provide novel means whereby the shifting rods for the low as well as the high gears are latched before released simultaneously.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 illustrates a sectional view of a casing showing a clutch in section and the locking mechanism in elevation;

Fig. 2 illustrates an enlarged detail view of the latching mechanism;

Fig. 3 illustrates an end view of the shifting rods with the latch in elevation;

Fig. 4 illustrates a plan view of the shifting rods; and

Fig. 5 illustrates a similar view thereof shifted with relation to each other.

In these drawings 10 denotes any suitable housing which, however, does not form a part of the present invention and need not be described in detail.

The usual transversely disposed shaft 11 may be rotatably mounted in known manner and the said shaft has depending members such as 12 which engage a collar 13 on the driven shaft 14, the clutch member 15 being slidable on the shaft and operated by the member 12 when it is disengaged from the clutch member 16, which clutch member may also comprise the balance wheel of an internal combustion motor, although this detail of construction may be variously modified to suitable particular requirements, it being understood of course that the clutch member 16 is carried by the crank shaft 17 and that the driven shaft is separate from the crank shaft 17.

The clutch pedal 18 has a lever 19 which is connected to the shaft 11 so that as the lever 19 is oscillated the shaft 11 is partially rotated to cause the movement of the clutch member 15.

The gear shifting lever 20 may be of any appropriate construction and it may coöperate with shifting rods 21 and 22 of any of the well known types, but in carrying the invention into practice, the shifting rod 21 would have a plurality of recesses 23 and the rod 22 would have a plurality of recesses 24, one of the recesses of the bar 21 being always alined with one of the recesses of the bar 22 when a complete shifting operation has been effected.

In the position of the parts shown in Fig. 2, the members 21 and 22 would have all of the recesses alining and this would be the neutral position of the transmission gearing. Upon operating the shifting lever one or the other of the bars would be moved longitudinally and that would shift the recesses of the bar 21 with relation to the recesses of the bar 22 and they would therefore be in the positions shown in Fig. 5.

A latch or dog 25 has a nose 26 which is adapted to enter the recesses of the bars when any two recesses are in alinement and when in such engagement, the bars are held against movement. The latch 25 is mounted on a pivot 27, which pivot is suitably anchored so that the latch will be mounted in operative relation to the bars and the edge of said latch is serrated as shown at 28 to engage teeth 29 on the link 30 which is pivotally mounted on the lever 19, so that the latch is raised or lowered according to the direction of movement of the lever 19 and it follows that when the clutch lever 19 is forced inwardly to throw the clutch member 15 out of engagement with the clutch member 16, the nose of the latch will be disengaged from the bars and the shifting lever may then be operated, whereas upon restoring the clutch members into operative relation to each other, it will be necessary to release the lever 19 so that the latch will again operate in conjunction with the members for holding them against movement.

Also it is necessary for two recesses in the shifting rods, 23 and 24 to be opposite in order to allow nose 26 to engage and lock thereby, and simultaneously allow the clutch to engage, which means that there will have to be a full cog in the transmission gears before the clutch will engage.

I claim—

1. In a transmission lock-out, gear shifting rods, means for operating the said rods, the said rods having recesses, a dog, means for pivotally mounting the dog whereby it enters the recesses of the rods, serrations on the edge of said dog, a link having teeth engaging the serrations of the dog, a clutch operating lever, and means whereby the said link and clutch operating member are operated simultaneously.

2. In a transmission lock-out, gear shifting rods, means for operating the said rods, a dog, means for pivotally mounting the dog for engaging the rods and holding them against movement, serrations on the edge of said dog, a link having teeth engaging the serrations of the dog, a clutch operating lever, and means whereby the said link and clutch operating member are operated simultaneously.

LOREN B. HORR.